(12) United States Patent
Kliner (10) Patent No.: US 12,537,359 B2
(45) Date of Patent: Jan. 27, 2026

(54) FIBER-BASED OPTICAL MODULATOR

(71) Applicant: nLIGHT, Inc., Camas, WA (US)

(72) Inventor: Dahv A. V. Kliner, Portland, OR (US)

(73) Assignee: nLIGHT, Inc., Camas, WA (US)

( * ) Notice: Subject to any disclaimer, the term of this patent is extended or adjusted under 35 U.S.C. 154(b) by 1029 days.

(21) Appl. No.: 17/633,198

(22) PCT Filed: Aug. 5, 2020

(86) PCT No.: PCT/US2020/044956
§ 371 (c)(1),
(2) Date: Feb. 5, 2022

(87) PCT Pub. No.: WO2021/026202
PCT Pub. Date: Feb. 11, 2021

(65) Prior Publication Data
US 2022/0337023 A1    Oct. 20, 2022

Related U.S. Application Data (60) Provisional application No. 62/883,592, filed on Aug. 6, 2019.

(51) Int. Cl.
*H01S 3/106* (2006.01)
*G02F 1/01* (2006.01)
*H01S 3/067* (2006.01)

(52) U.S. Cl.
CPC .......... *H01S 3/1067* (2013.01); *G02F 1/0134* (2013.01); *G02F 1/0136* (2013.01); *H01S 3/06712* (2013.01)

(58) Field of Classification Search
CPC .. H01S 3/1067; H01S 3/06712; H01S 3/1109; H01S 3/121; H01S 3/0085;
(Continued)

(56) References Cited

U.S. PATENT DOCUMENTS 4,960,319 A * 10/1990 Dankowych ........... G02B 26/00
398/195
5,386,484 A    1/1995 Ooka et al.
(Continued)

FOREIGN PATENT DOCUMENTS

DE    102015106633 A1    11/2016

OTHER PUBLICATIONS

International Search Report and Written Opinion for International PCT Application No. PCT/US2020/044956, mailed Oct. 29, 2020, 7 pages.

*Primary Examiner* — Xinning(Tom) Niu
(74) *Attorney, Agent, or Firm* — Wiley Rein LLP (57) ABSTRACT

Systems and methods for temporal amplitude modulation of an optical beam. An exemplary system may include a birefringent fiber positioned between two polarizers, or between a polarized input light source and an output polarizer. Light may enter the birefringent fiber as linearly polarized. Depending on birefringence and orientation of the birefringent fiber, the polarization state changes as the light propagates through the birefringent fiber. This changed polarization state then enters the output polarizer, for which transmission is a function of the polarization state and the relative orientation of the polarization axis. The polarization state emerging from the birefringent fiber may be changed by modulating the fiber birefringence, for example through application of an external stress. Net transmittance of the system may be varied according to a magnitude of an external force (e.g., pressure) to some or all of the birefringent fiber.

18 Claims, 9 Drawing Sheets

(58) Field of Classification Search
CPC ...... H01S 3/07; H01S 3/0675; H01S 3/08013; G02F 1/0134; G02F 1/0136; G02B 6/274
See application file for complete search history.

(56) References Cited

U.S. PATENT DOCUMENTS

| | | | | |
|---|---|---|---|---|
| 5,577,057 | A * | 11/1996 | Frisken | H01S 3/1112 |
| | | | | 372/18 |
| 6,873,783 | B1 * | 3/2005 | Yao | G02F 1/0136 |
| | | | | 385/11 |
| 2002/0191883 | A1 * | 12/2002 | Wood | G02F 1/0136 |
| | | | | 385/11 |
| 2004/0114878 | A1 * | 6/2004 | Yamada | G11B 7/1384 |
| 2008/0095199 | A1 * | 4/2008 | Abramczyk | G02B 6/14 |
| | | | | 372/6 |
| 2010/0073681 | A1 * | 3/2010 | Qiu | G01C 19/721 |
| | | | | 356/460 |
| 2018/0269645 | A1 * | 9/2018 | Cannon | H01S 3/2308 |

\* cited by examiner

FIBER-BASED OPTICAL MODULATOR

CLAIM FOR PRIORITY

This application is a National Stage of International Application No. PCT/US2020/044956, filed Aug. 5, 2020, which claims priority benefit of U.S. Provisional Patent Application No. 62/883,592, filed on Aug. 6, 2019, both of which are incorporated by reference in their entireties.

TECHNICAL FIELD

The technology disclosed herein relates to optical modulators. More particularly, the disclosed technology relates to fiber-based optical beam modulation methods, apparatus, and systems.

BACKGROUND

Optical systems have many applications, including communication, materials processing, and sensing. Such optical systems often employ lasers, for example, fiber lasers, disk lasers, diode lasers, diode-pumped solid state lasers, and lamp-pumped solid state lasers. In these systems, optical power is often delivered by an optical fiber.

An optical modulator is a device often included in an optical system where a parameter or characteristic of the light is to be varied over time. Some modulators are useful for varying an intensity (amplitude) of a light beam exiting the optical modulator. Some such modulators are absorptive modulators and refractive modulators. Some absorptive modulators include a material that has an absorption coefficient that can be manipulated, for example through Franz-Keldysh effect, or the Quantum-confined Stark effect (QCSE). Some refractive modulators include a material that displays an acousto-optic effect where an index of refraction is modulated via an acoustic wave, or a magneto-optic effect where polarization of a material is modulated via a quasistatic magnetic field. Such phase modulation can then be converted into an intensity modulation.

Conventional optical modulators exemplified above typically employ free-space or bulk optical components, which come with an associated cost, increase in optical system complexity, inherent optical losses, and/or reliability constraints. A fiber-based, or "all-fiber," optical modulator is advantageous as eliminating one or more of the constraints associated with free-space optical modulators.

BRIEF DESCRIPTION OF THE DRAWINGS

The accompanying drawings, wherein like reference numerals represent like elements, are incorporated in and constitute a part of this specification and, together with the description, explain the advantages and principles of the presently disclosed technology. In the drawings.

DETAILED DESCRIPTION

As used herein throughout this disclosure and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. Also, the terms "modify" and "adjust" are used interchangeably to mean "alter."

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high level abstractions of the actual operations that are performed. The actual operations that correspond to these terms will vary depending on the particular implementation and are readily discernible by one of ordinary skill in the art.

In some examples, values, procedures, or apparatus are referred to as "lowest", "best", "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like.

These terms are used for convenient description, but do not imply any particular spatial orientation.

Reference throughout this specification to "an embodiment" or "one embodiment" or "some embodiments" means that a particular feature, structure, function, or characteristic described in connection with the embodiment is included in at least one embodiment. Thus, the appearances of the phrase "in an embodiment" or "in one embodiment" or "some embodiments" in various places throughout this specification are not necessarily referring to the same embodiment. Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

A "device" may generally refer to an apparatus according to the context of the usage of that term. For example, a device may refer to a stack of layers or structures, a single structure or layer, a connection of various structures having active and/or passive elements, etc. Generally a device is a three dimensional structure with a lateral x-y plane and a height along the z direction within an x-y-z Cartesian coordinate system. The plane of the device may also be the plane of an apparatus, which comprises the device.

Unless otherwise specified the use of the ordinal adjectives "first," "second," and "third," etc., to describe a common object, merely indicates that different instances of like objects are being referred to, and are not intended to imply that the objects so described must be in a given sequence, either temporally, spatially, in ranking or in any other manner.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

Disclosed herein are systems and methods for modulating amplitude of an optical beam. An exemplary system in accordance with some embodiments includes a birefringent fiber positioned between two polarizers (or between a polarized input light source and an output polarizer). Alternatively, one of these polarizers (e.g., the input polarizer) may be replaced by a polarized light source (as an input source). Transmission of the system may be varied by applying an external force (e.g., pressure) to some or all of the birefringent fiber. In some exemplary embodiments, the system is an all-fiber device where various fibers are spliced together into a monolithic device (i.e. no free-space optics). The system may be bidirectional (i.e., light may propagate or transmit through the device in either direction).

During operation of the system, light enters the birefringent fiber as linearly polarized. Depending on the birefringence and orientation of the birefringent fiber, the polarization state changes as the light propagates through the birefringent fiber. This changed polarization state then enters the second polarizer (i.e., the output polarizer), for which transmission is a function of the polarization state and the relative orientation of the polarization axis. The polarization state emerging from the birefringent fiber and entering the output polarizer may be changed by manipulating the birefringent fiber so as to modulate the fiber birefringence. In some embodiments, an external stress is applied to the birefringent fiber. For example, a pressure transducer may apply a varying pressure to the birefringent fiber, which modulates the net system transmittance in accordance with the varying pressure. A time-dependent application of external stress to the birefringent fiber can therefore induce a time-dependent transmittance, i.e., temporal amplitude modulation.

Methods may include receiving an optical beam having a first linear polarization state, or linearly polarizing a depolarized beam with a first polarizer into a first linear polarization state. Once so polarized, the beam enters the birefringent fiber having birefringence axes oriented so that optical power is coupled into both polarization modes of the birefringent fiber. With optical power coupled into both polarization axes, the polarization state of the beam evolves along the length of the birefringent fiber. The length of the birefringent fiber may be selected (e.g., to be an integer of the beat length) so that in a first (e.g., high system transmittance) fiber state, the polarization state of the beam exiting the birefringent fiber matches that of the beam coupled into the birefringent fiber. With the polarization state maintained, the beam enters an output polarizer that is oriented to most strongly transmit light having the first polarization state. As a result, the beam exiting the polarizer has high amplitude associated with the first fiber state.

Methods include receiving a control signal, and acting upon the length of birefringent fiber, in response to the control signal, to modulate an external stress that induces a change in the birefringence of the birefringent fiber relative to the first fiber state. The change in birefringence causes the polarization state of the beam exiting the birefringent fiber to deviate from that of the beam launched in the birefringent fiber. With the polarization changed from the first polarization state, the beam enters the polarizer, which, being oriented to match that of the first linear polarization state, attenuates the light. As a result, the beam exiting the polarizer has lower amplitude associated with a second fiber state.

Hence, with a time varying application of external stress to the birefringent fiber, transmittance of a beam may be modulated from a first transmittance level at a first time instance to a second transmittance level at a second time instance. In some embodiments, action upon the birefringent fiber reduces an optical power transmitted through the polarizer of the optical output by at least 10% between the first time instance and the second time instance.

Apparatus disclosed herein include an optical beam modulator, comprising an optical input to receive a polarized optical beam, and a length of birefringent fiber between the optical input and an optical output. The modulator comprises a perturbation device to modulate, through action upon the birefringent fiber, a transmittance of the beam through an output polarizer between a first transmittance level at a first time instance to a second transmittance level at a second time instance. In some embodiments, the modulator comprises a controller input that is coupled to the perturbation device, and the perturbation device is operable to act upon the birefringent fiber in response to a control signal received through the controller input. In some examples, the action upon the birefringent fiber alters optical losses within an output polarizer. A first level of transmittance is associated with a lesser attenuation of the optical beam by the output polarizer. A second level of transmittance is associated with a greater attenuation of the optical beam by the output polarizer.

The fiber-based modulator embodiments described herein may be integrated into a number of larger optical systems. Systems disclosed herein may include, an optical beam delivery system, comprising an optical fiber. The optical system may include a modulator devoid of free-space optics.

The optical system may include one or more free-space optics configured to receive and transmit an optical beam modulated by the modulator.

In some implementations, such as a mode-locked or Q-switched laser, an optical gain medium may be energized within a resonant optical cavity that includes the fiber-based modulator. An optical beam within the cavity may then be modulated in response to a control signal. The modulating induces a temporally varying optical loss within the cavity through action upon birefringent fiber. At least a portion of the optical beam is coupled out of the resonant cavity. In some such embodiments, action upon the fiber modulates a transmittance of the optical beam between a first transmittance level and a second transmittance level to induce pulsed operation of the laser. In some of these embodiments, transmittance of the optical beam between the first and second levels is modulated at a repetition rate sufficient to actively mode-lock the laser. In some other of these embodiments, a difference between the first and second transmittance levels is of a sufficient magnitude to Q-switch lasing within the cavity.

In other embodiments, an optical gain medium may be energized within a resonant optical cavity and at least a portion of the optical beam is coupled out of the cavity and into the fiber-based modulator. Pulses that exit the cavity are picked in response to a control signal. The picking of pulses may further comprise action upon the birefringent fiber of the modulator, which modulates a transmittance of the optical beam between first and second transmittance levels.

In other embodiments, an optical gain medium may be energized within a resonant optical cavity and at least a portion of the optical beam is coupled out of the cavity and into the fiber-based modulator. The output power transmitted through the modulator and/or rejected by the modulator is monitored, and the modulator transmittance is varied to stabilize the transmitted or rejected power, respectively. This "noise eater" function results in a more stable output power.

Notably, modulators described herein are compatible with a wide variety of optical systems. For example, modulators described herein may be well suited to a variety of applications, including optical telecommunications, materials processing, chemical or physical sensing, and medical or biological applications, among others. Also of note, modulators described herein are compatible with optical systems that include a wide variety of lasers. For example, any of the lasers described elsewhere herein may be included in an optical system that further includes a modulator having one or more of the features described herein. In some embodiments, a laser, such as, but not limited to, fiber lasers and fiber-coupled lasers, may be coupled to an optical input of a modulator. In other embodiments, a modulator may be incorporated within a laser cavity such that the modulator is a component of a laser.

Figure 1:
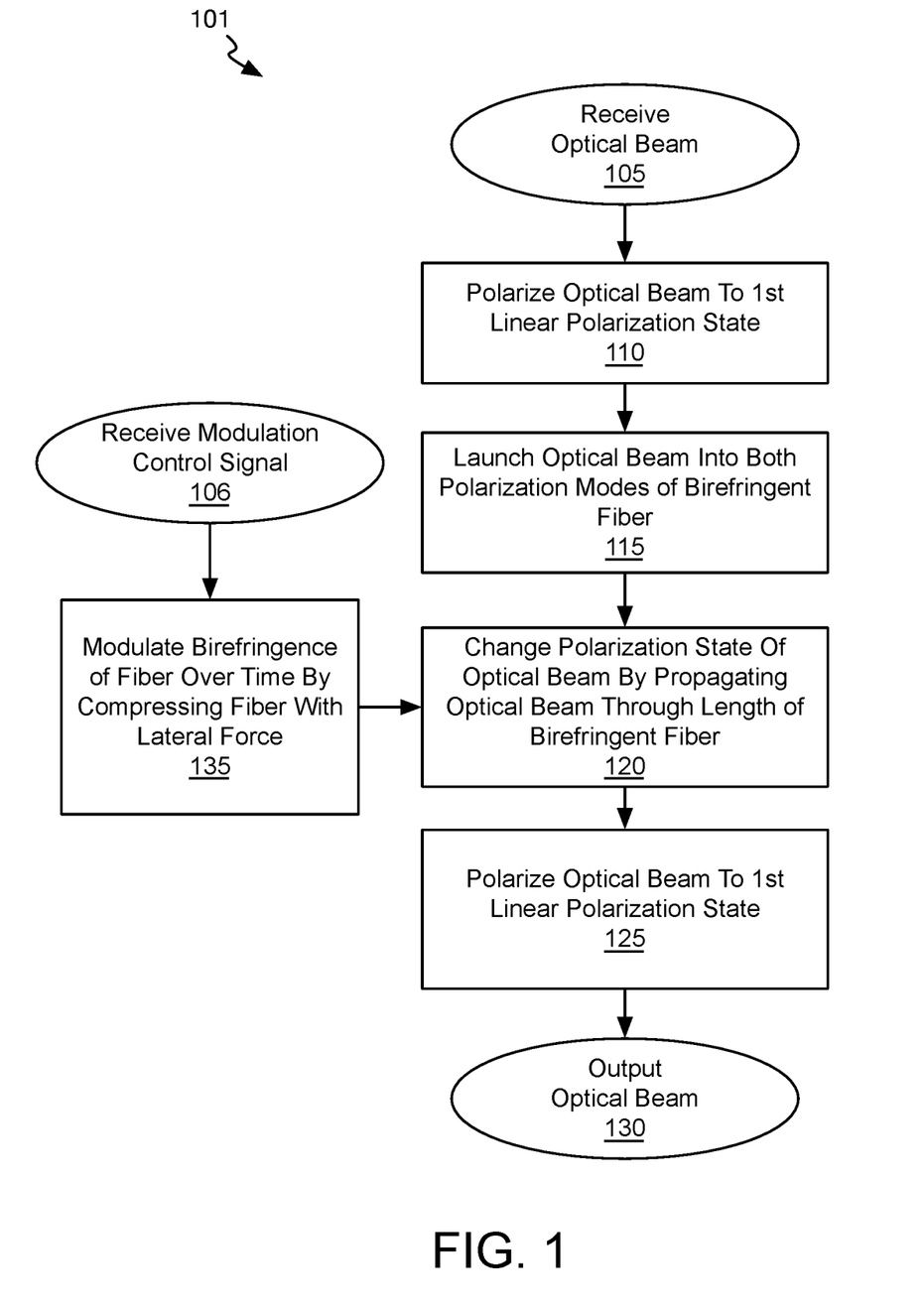
FIG. 1 illustrates example methods of optical beam modulation, in accordance with some embodiments.

FIG. 1 is a flow diagram illustrating exemplary methods 101 for modulating optical beam transmittance, in accordance with some embodiments. Methods 101 may be implemented, for example, by a fiber-based optical modulator as described further below. Methods 101 begin at block 105 where an optical beam is received. The beam may have been generated by a laser, for example, and may have been transmitted from an output of the laser through any optical path prior to being received at block 105. Regardless of origin, the beam is first polarized at block 110 to a predetermined first linear polarization state. Once initially polarized, the beam is associated with some non-zero incident radiant flux or power, yin (e.g., measured in units of Watts). The polarized beam is then launched into a birefringent fiber at block 115 so that optical energy is coupled into both polarization modes of the fiber.

At block 120, the birefringent fiber changes the polarization state of the optical beam as the beam propagates through a predetermined fiber length. In exemplary embodiments, the birefringent fiber length is selected to be substantially equal to the beat length (130 for a given external condition the fiber experiences in a first state. In this first state, polarization of the optical beam will vary according to propagation velocities of the fast and slow axes of the fiber so as to arrive at the end of the birefringent fiber in substantially the same polarization state it had when launched into the fiber.

At block 125, the polarized beam is conveyed to an output polarizer, which passes primarily a linear polarization state that is predetermined based on the first polarization state. For example, the output polarizer may be aligned with the input polarization state so that the output polarizer passes primarily the first linear polarization state and heavily attenuates all other polarization states. With the birefringent fiber in the first state, the output polarizer outputs at block 130 an output beam having a first (reference) output power, $y_{out}$. An optical modulator may so implement methods 101 while the modulator is in a first (reference) state, for example. The fraction of the beam power transmitted at block 130 may be associated with a reference total transmittance $T_{t0}$, or $$\frac{y_{out}}{y_{in}}\Big|_{t0}$$

of a modulator in the reference state at some reference time $t_o$.

At block 106, a modulation control signal is received. The modulation control signal may be received, for example, through a modulator's controller input. The modulation control signal may be any digital or analog signal suitable for triggering a state change in a modulator that is to impact the transmittance of the optical beam. The modulation control signal may be indicative of a logic level shift that triggers a change in modulator state from the first (reference) state to a second state. Alternatively, the modulation control signal may be a drive signal that drives the change in modulator state from the first state to the second state. Methods 101 continue at block 135, which is performed in response to the modulation control signal received at block 106.

At block 135, a length of the birefringent fiber is acted upon to modulate, based on the modulation control signal, the total transmittance of the beam through the output polarizer. The action upon the fiber(s) at block 135 may be, for example, any of the actions described further below. In the context of modulation methods 101, the action upon the fiber(s) at block 135 is to change the total transmittance of the beam through the output polarizer from the reference transmittance level. Since the birefringent fiber is optically coupled to the output polarizer, beam power at the optical output of the polarizer may be modulated as a function of the action at block 135. As described further below, the action at block 135 may comprise application of a force (e.g., lateral pressure force, or compression) that is along a predetermined direction relative to the birefringence axes. In some exemplary embodiments, the lateral force is parallel to the slow axis of the birefringent fiber. For such embodiments, application of greater force increases the phase delay between the fast and slow axes. In the alternative, the application of greater force may decrease the phase delay between the fast and slow axes (e.g., where the lateral force is parallel to the fast axes). In either case, the modulation of the force applied impacts the phase delay within the fiber, for example through the photo-elastic effect. As a result of the modulation in phase delay the beam exits the length of birefringent fiber with a second polarization state that differs from the first polarization state (e.g., elliptical, circular, or orthogonally linear).

Methods 101 continue by returning to block 125 where the input beam power is received, the majority of which is attenuated as being outside of the first polarization state, and therefore not as well aligned with the output polarizer as it is when the system is in the first state. As a result, only some fraction of the input power is transmitted through the output polarizer at operation 130. The fraction is now a total transmittance $$T_{t1}\left(\frac{y_{out}}{y_{in}}\bigg|_{t1}\right)$$

of the modulator while in a modulated state at some reference time $t_1$. Methods 101 continue over time with transmittance varying with time as a function of modulation in the control signal.

Figure 2:
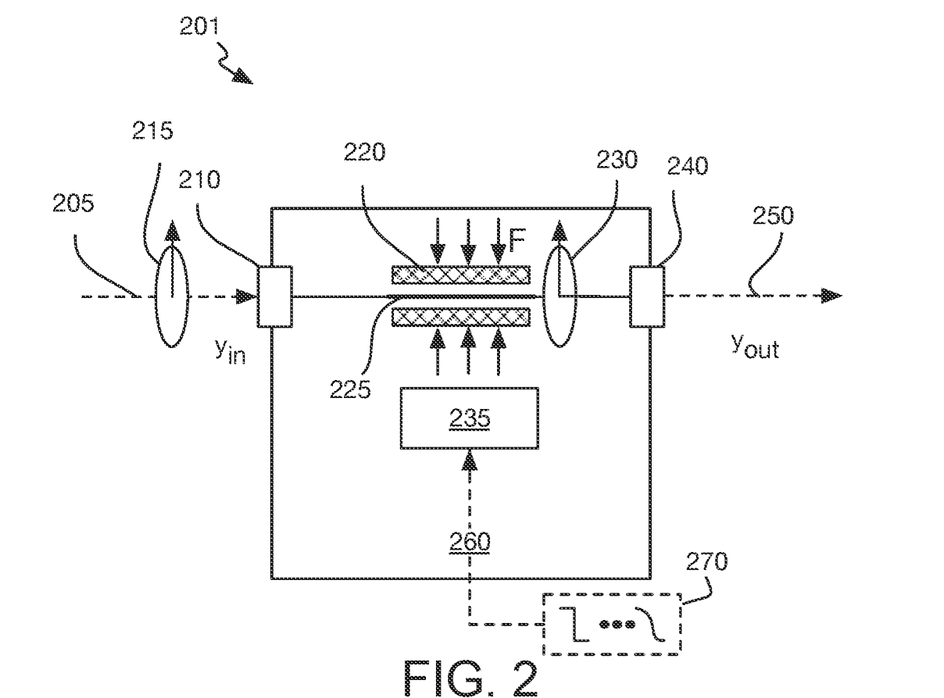
FIG. 2 illustrates a schematic of a fiber-based optical modulator, in accordance with some embodiments.

FIG. 2 illustrates an exemplary optical modulator 201 suitable for modulating optical beam transmittance, in accordance with some embodiments. Optical modulator 201 may implement methods 101, for example. Optical modulator 201 comprises an optical input 210 to receive an input optical beam 205 that has been polarized into a first linear polarization state by an optical polarizer 215. Optical polarizer 215 may be any free space or integrated polarizer known to be suitable for the optical beam. The polarized optical beam is coupled into modulator input 210. Optical input 210 may comprise any suitable optical port or coupling, such as, but not limited to, a fiber splice junction, a free air gap, a free-space or bulk optic, glue, index-matching material, butt-coupled fibers, or the like, or any combination thereof. At input 210, the polarized optical beam 205 has input power yin. Input power yin may have any value suitable for the optical system into which modulator 201 is integrated as embodiments herein are not limited in this respect.

Optical beam 205 is coupled from input 210 to a birefringent fiber 225 by any means known to be suitable, such as, but not limited to, a single-mode (SM) or multimode (MM) optical fiber. Birefringent fiber 225 is between optical input 210 and an output polarizer 230. For embodiments where optical beam 205 is coupled into input 210 through a fiber, that fiber may be fused at input 210 with input 210 then being a splice junction, to another fiber, for example.

Birefringent fiber 225 may be any fiber having birefringence along two orthogonal axes of its section, also known as slow and fast axes corresponding to higher and lower refractive indexes, respectively. When a light wave travels through birefringent fiber 225, the polarization state of the light can be maintained if two orthogonal modes of the light are launched in alignment with the birefringent axes. As such, birefringent fibers are often referred to a "polarization maintaining" (PM) fibers. However, as described further below, birefringent fiber 225 has the slow and fast axes oriented relative to input 210 so that optical beam 205 is launched into birefringent fiber 225 with its polarization oriented out of alignment with the birefringent axes. For example, in some embodiments, optical beam 205 is launched into birefringent fiber 225 with the first polarization state aligned to 45° of the slow and fast axes so that substantially equal optical power is coupled into both axes.

Birefringent fiber 225 is coupled to propagate the optical beam into output polarizer 230. Output polarizer 230 has a polarization orientation relative to the first polarization state. For some exemplary embodiments, output polarizer is oriented to pass the first linear polarization state output by polarizer 215. In other words polarizers 215 and 230 are aligned. In other embodiments, polarizers 215 and 230 may be crossed. Output polarizer may be any fiber-based or free-space polarizer.

Optical beam power exiting polarizer 230 propagates through optical output 240, which may be any suitable optical port or coupling, such as, but not limited to, a fiber splice junction, a free air gap, a free-space or bulk optic, glue, index-matching material, butt-coupled fibers, or the like, or any combination thereof. In some embodiments, optical output 240 is substantially the same as optical input 210 (e.g., both splice junctions, both glues, etc.). Optical beam 250 with output power your exits modulator 201. Optical beam 250 may be coupled from output 240 by any means known to be suitable for optical output 240, such as, but not limited to, a SM or MM optical fiber.

Modulator 201 includes perturbation device 235. Perturbation device 235 is to modulate, through external force applied upon a length of birefringent fiber 225, modulation of the polarization state of the beam as it propagates through fiber 225. In some exemplary embodiments, perturbation device 235 comprises a pressure transducer 220 that applies a time varying external stress to the fiber 225. The time varying external stress induces a time vary phase delay between the slow and fast axes within birefringent fiber 225. In some examples, pressure transducer 220 applies a compressive force along the entire length of birefringent fiber 225. However, pressure may instead be applied to only a portion of the length of birefringent fiber 225.

Perturbation device 230 may be responsive to a controller input 260. Controller input 260 is communicatively coupled to perturbation device 210, and is operable to receive a modulation control signal. Controller input 260 may be any passive or active communication link known to be suitable for conveying at least one of control logic signals or drive signals. In the illustrated example, controller input 260 receives an external control signal 270. Controller input 260 may be merely indicative of, based on, or a function of, external control signal 270. In some embodiments, control signal 270 is provided by a function generator, which may output any time varying analog waveform. External control signal 270 may be suitable for directly driving perturbation device 230 into different states that impart different levels of external stress (e.g., less external stress and more external stress). In some other embodiments, external control signal 270 comprises a time varying digital signal having at least two logic levels (e.g., HI/LO). Perturbation device 230 then is driven into a state that imparts a level of external stress (e.g., less and more) based on logic levels of external control signal 270.

Figure 3:
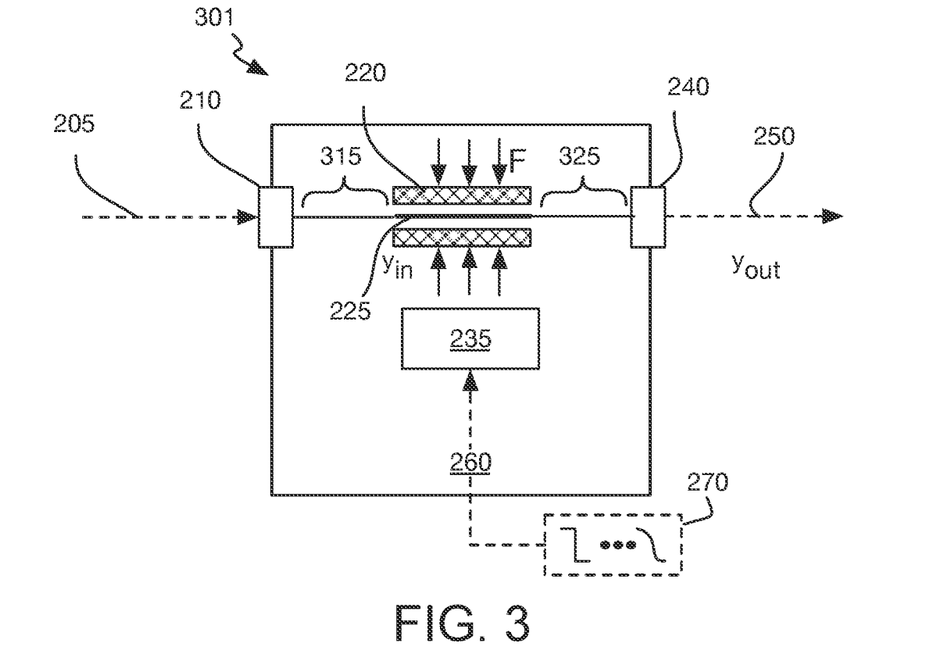
FIG. 3 illustrates a schematic of an all-fiber optical modulator, in accordance with some embodiments.

FIG. 3 illustrates a schematic of a modulator 301, which is an all-fiber device. Modulator 301 is one exemplary implementation of modulator 201 where the modulator includes both an input polarizing fiber 315, and an output polarizing fiber 325. Birefringent fiber 225 is coupled between the two polarization fibers 315, 325, for example, with an end-to-end splice at each end of fiber 225. As such, the fibers 315, 225 and 325 are separate lengths of monolithic fiber. For modulator 301, input power yin is referenced at the splice between input polarizing fiber 315 and birefringent fiber 225. With modulator 301 including input polarizer 315, optical beam 205 entering input 210 may be optionally depolarized by any suitable means.

Figure 4A:
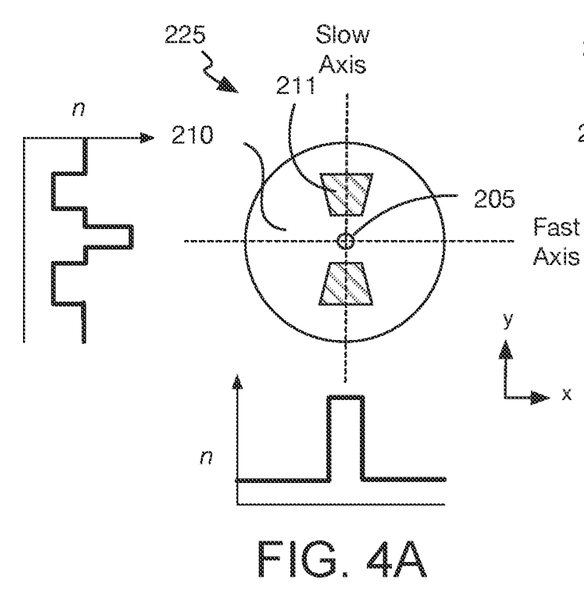
FIGS. 4A, 4B, and 4C illustrate cross-sectional views of fiber suitable for one or more of polarizing fiber and birefringent fiber, in accordance with some embodiments.
Figure 4B:
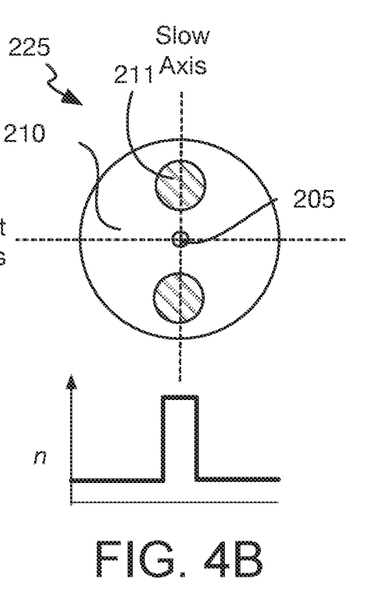
Figure 4C:
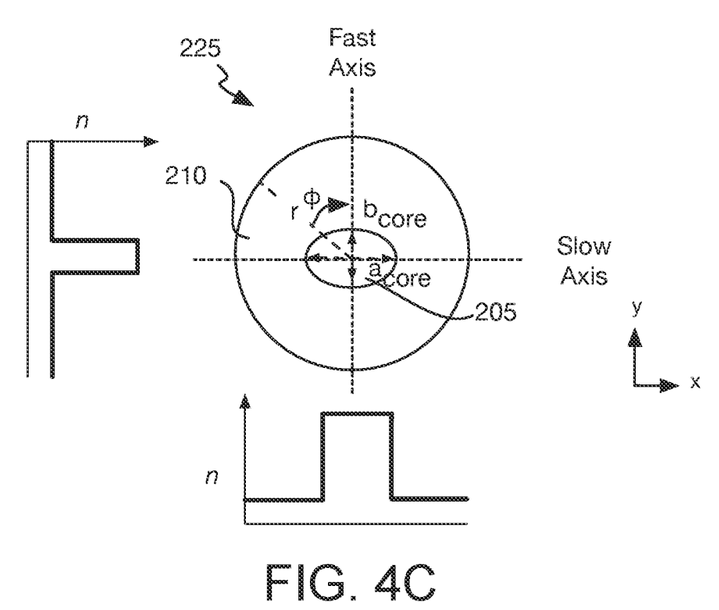

Birefringent fiber 225 may have one or more of form-based birefringence or stress-based birefringence, for example. FIGS. 4A and 4B illustrate cross-sectional views of exemplary stress-based birefringence fiber including stressing components in the fiber cladding on opposite side of core 205. Exemplary refractive index profiles along fast and slow axes are further illustrated. In FIG. 4A, birefringent fiber 225 has a bow-tie architecture in which a cladding 210 includes trapezoidal stress rods 211. Stress rods 211 induce linear birefringence based on internal fiber stress. Stress rods 211 may be of any material (e.g. aluminum and/or boron-doped glass), and take other geometric forms, such as the panda pattern illustrated in FIG. 4B. Although single clad (SC) fiber is illustrated, birefringent fiber 255 may also be multi-clad (e.g., double, triple, etc.). FIG. 4C illustrates a cross-sectional view of an exemplary form-based birefringence fiber 225 that has a radially asymmetric refractive index profile (RIP) such that the core is elliptical. Elliptical core 205 has a major axis $a_{core}$ and minor axis $b_{core}$. Ellipticity and dimensions of core 205 may vary with application. Ellipticity may be as little as a few percent out-of-round to a few tens of percent, for example.

Any of the exemplary fiber architectures illustrated in FIG. 4A-4C may be employed in modulator 201, 301, for example. In modulator 301, these same fiber architectures may be further employed as the polarizing fibers 315, 325. Unlike birefringent fiber 224 however, polarizing fibers 315 have a significant polarization extinction ratio (PER), which may be 30 dB, or more, for example.

Figure 5:
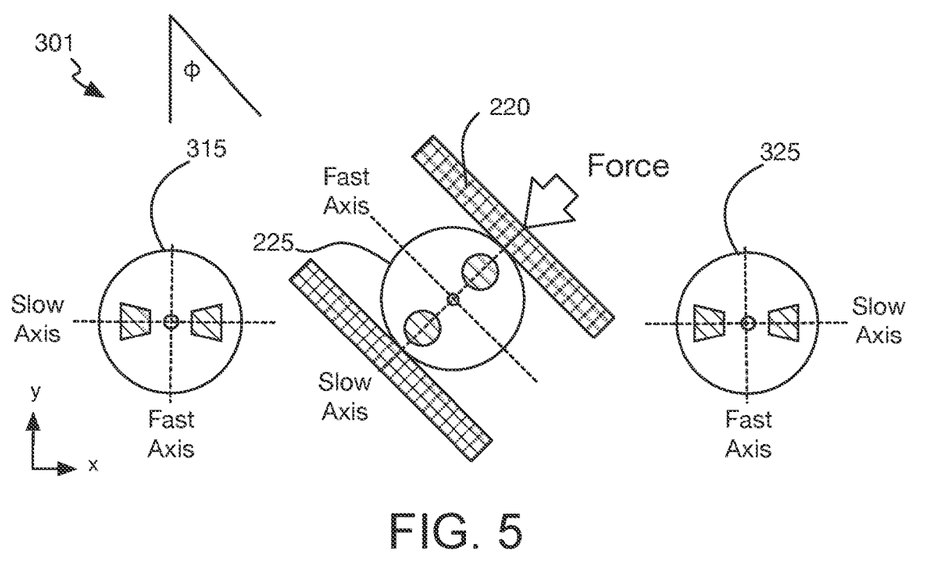
FIG. 5 illustrates cross-sectional views of polarizing fiber and birefringent fiber to illustrate their relative orientations, in accordance with some embodiments.

FIG. 5 illustrates cross-sectional views of polarizing fibers 315 and 325 along with birefringent fiber 225 to illustrate their relative orientations, in accordance with some embodiments. One skilled in the art will recognize that the figure is exemplary, and other embodiments are within the scope of the invention. As shown in this example, the slow axis of polarizing fiber 315 is aligned on a reference x-axis. The slow axis of polarizing fiber 325 is similarly aligned with the slow axis of the polarizing fiber 315 to be on the x-axis. Linearly polarized light passed by polarizing fiber 315 would therefore have high transmittance through polarizing fiber 325 unless the polarization state is altered by birefringent fiber 225. As further shown in FIG. 5, birefringent fiber 225 has the birefringence axes at a relative angle φ that ensures some optical power from a linearly polarized beam exiting polarizing fiber 315 will couple into both orthogonal modes of birefringent fiber 225. In the illustrated example, φ is approximately 45° and so optical input power ($y_{in}$) is split approximately equally between the two modes. This relative angle φ may be varied, for example between 0° and 90°, to vary the response of the modulator to a perturbation. Likewise, although polarizing fibers 315 are illustrated as having their fast and slow axes aligned, they may be oriented differently relative to each other, and may even be crossed so only light having polarization state orthogonal to that exiting polarizing fiber 315 will transmit through polarizing fiber 325.

FIG. 5 further illustrates one example of a birefringence pressure transducer 220 for perturbing birefringent fiber 225. Pressure transducer 220 may be a piezoelectric device, a clamp (or other fastener), or the like, or any combination thereof. These are merely examples of pressure transducers and not an exhaustive listing. Clamps (or other fasteners) may be used to apply a varying degree of mechanical compressive stress along the birefringence axis of fiber 225. Clamps may move up and down along a track or platform. A controller may control the movement of clamps. Mechanical stress may be applied by an actuator that is controlled by controller 230, for example. However, this is merely an example of a method for inducing mechanical stress in fiber 220. In the illustrated example, pressure force F is applied in a direction parallel to the slow axis. Greater pressure force F will therefore increase a phase delay between the slow and fast axis. In other embodiments, pressure force F is applied in a direction parallel to the fast axis. Greater pressure force F will therefore decrease a phase delay between the slow and fast axis. In either case, phase delay is modulated such that birefringent fiber 225 may alter the polarization state of a beam as it propagates through fiber 225 by an amount that varies with the perturbation (e.g., applied pressure).

Although pressure transducer 220 is illustrated, any of a variety of devices, and/or assemblies may be otherwise configured to enable adjustment of polarization state of a beam propagating in birefringent fiber 225. For example, piezoelectric transducers may be used to induce perturbation of birefringence over a length of fiber 225. The piezoelectric material may be in the form of a jacket around the bare fiber, which may apply compression to the fiber, modifying the fiber's refractive index via the resulting changes in density. Perturbation may be dynamically controlled by controlling a voltage to the piezo-electric device.

Figure 6A:
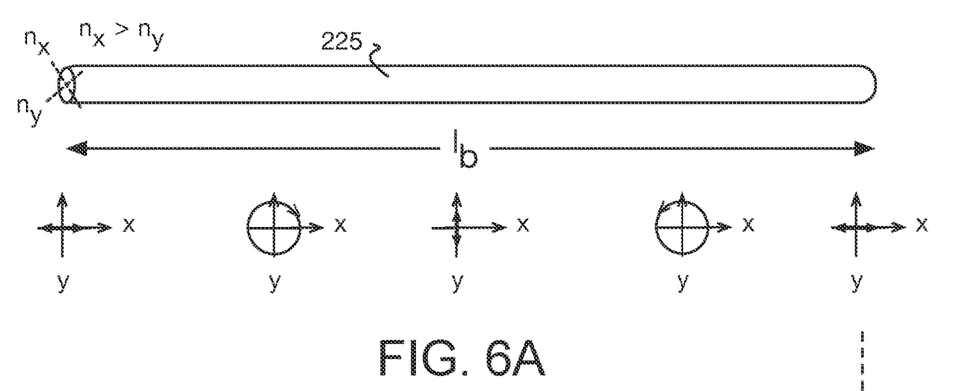
FIG. 6A illustrates spatial evolution of polarization state of a beam propagating through a birefringent fiber in a first fiber state, in accordance with some embodiments.

FIG. 6A illustrates spatial evolution of polarization state of a beam propagating through a birefringent fiber in a first fiber state, in accordance with some embodiments. The first fiber state may be associated, for example, with the application of lower (e.g., zero) external stress/force. As shown, birefringent fiber 225 has a beat length $l_b$ at an operating wavelength, and the length corresponds to a 2π phase shift between the fast and slow axes. In some exemplary embodiments where the birefringent fiber is glass and has a core diameter of approximately 125 μm, the beat length $l_b$ is approximately 3 mm. With the fast and slow axes of fiber 225 oriented 45° relative to the reference x-y axes, polarization state varies from the first linear polarization state aligned with the x-axis at launch in to fiber 225, through first elliptical states, to an orthogonally linear polarization state at $1/2l_b$, to second elliptical states, and returning to the first linear polarization state at the exit of fiber 225. In this first fiber state therefore, polarization state of the optical beam propagated through fiber 225 exits the fiber with substantially the same polarization state with which it was launched into fiber 225. As such, the polarizing fiber 325 may pass the polarized beam with higher transmission (lower attenuation).

Figure 6B:
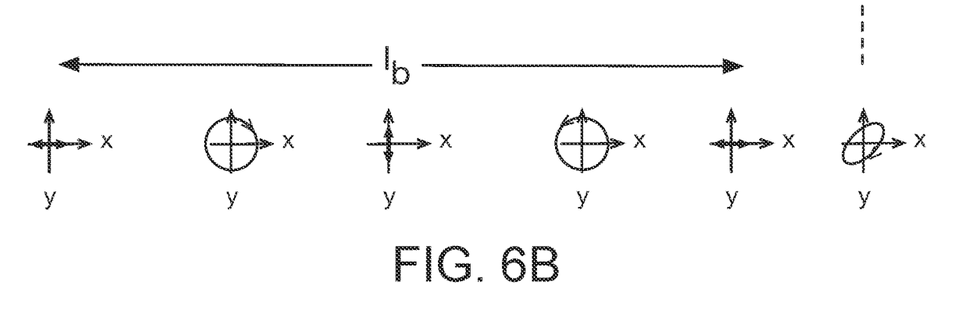
FIG. 6B illustrates spatial evolution of polarization state of a beam propagating through a birefringent fiber in a second fiber state, in accordance with some embodiments.

FIG. 6B illustrates spatial evolution of polarization state of a beam propagating through a birefringent fiber in a second fiber state, in accordance with some embodiments. The second fiber state may be associated, for example, with the application of higher (e.g., 7.5N/0.75 kg/1.6 lb) external stress/force. Such an amount of force is practical to apply with a piezoelectric pressure transducer, for example. If the force applied induces a stress that increases the birefringence, phase delay may be increased from that of the first fiber state. Beat length $l_b$ may then become somewhat less (e.g., less than 3 mm) at the operating wavelength so that the fixed fiber length corresponds to more than a 2π phase shift between the fast and slow axes. Polarization state then varies from the first linear polarization state aligned with the x-axis at launch in to fiber 225, and past the a return to first linear polarization state at the exit of fiber 225. In this second fiber state therefore, polarization state of the optical beam propagated through fiber 225 exits the fiber with a different polarization state that it had at launch. As such, the polarizing fiber 325 may pass the polarized beam with lower transmission (higher attenuation).

Figure 7A:
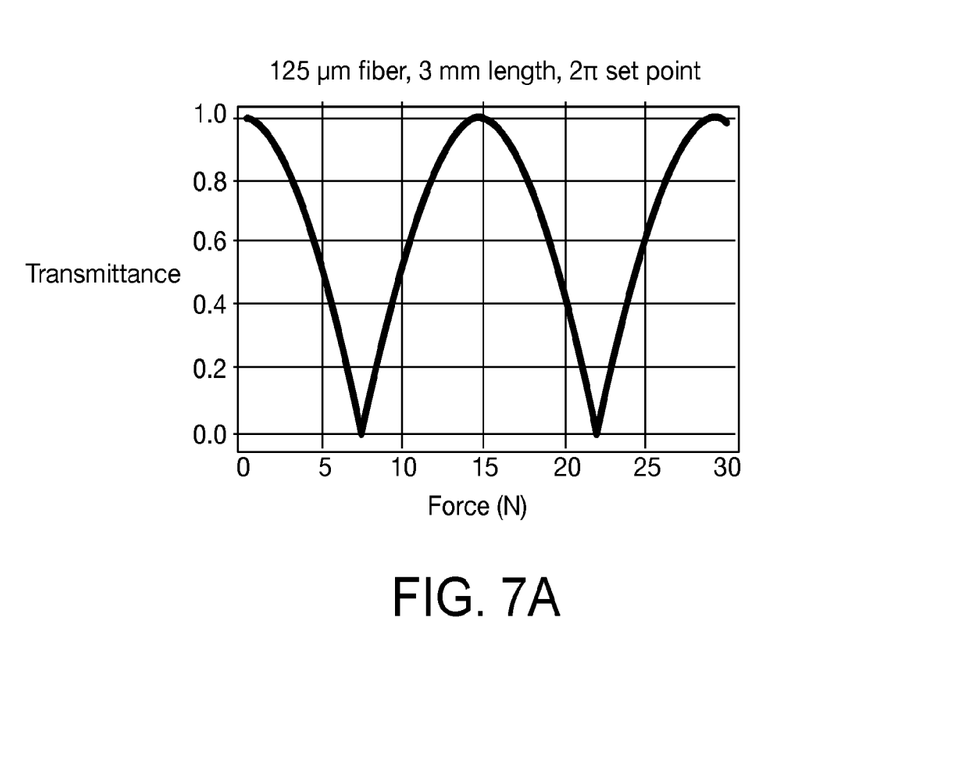
FIGS. 7A, 7B, 7C, and 7D are graphs illustrating calculated transmittance of a fiber-based modulator as a function of force applied to a birefringent fiber, in accordance with some embodiments.
Figure 7B:
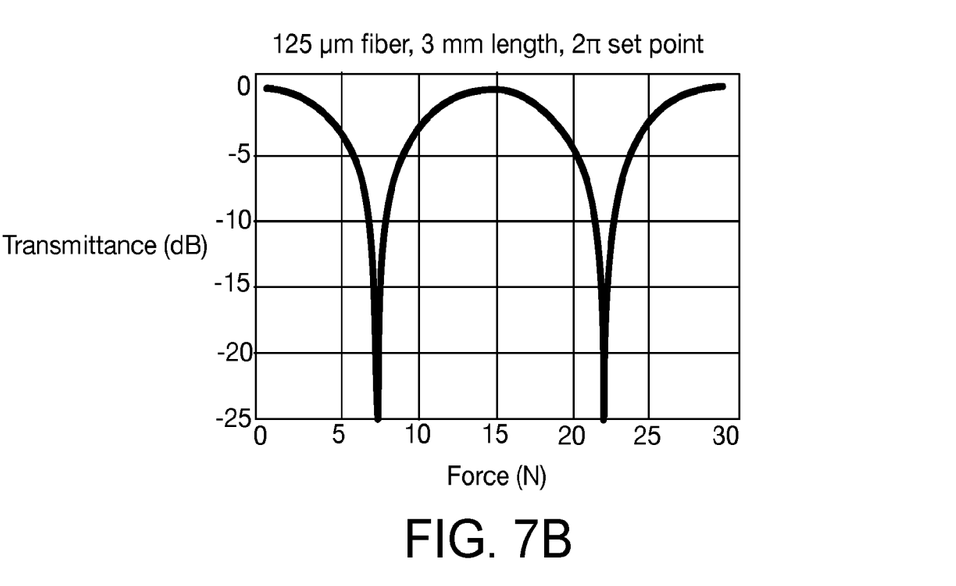

FIGS. 7A, 7B, 7C, and 7D are graphs illustrating calculated transmittance of a fiber-based modulator as a function of force applied to a birefringent fiber, in accordance with some embodiments. As seen in FIGS. 7A and 7B, the transmittance varies from 100% to the minimum (0% in principle) when the force is increased from 0 N to 7.3 N.

Figure 7C:
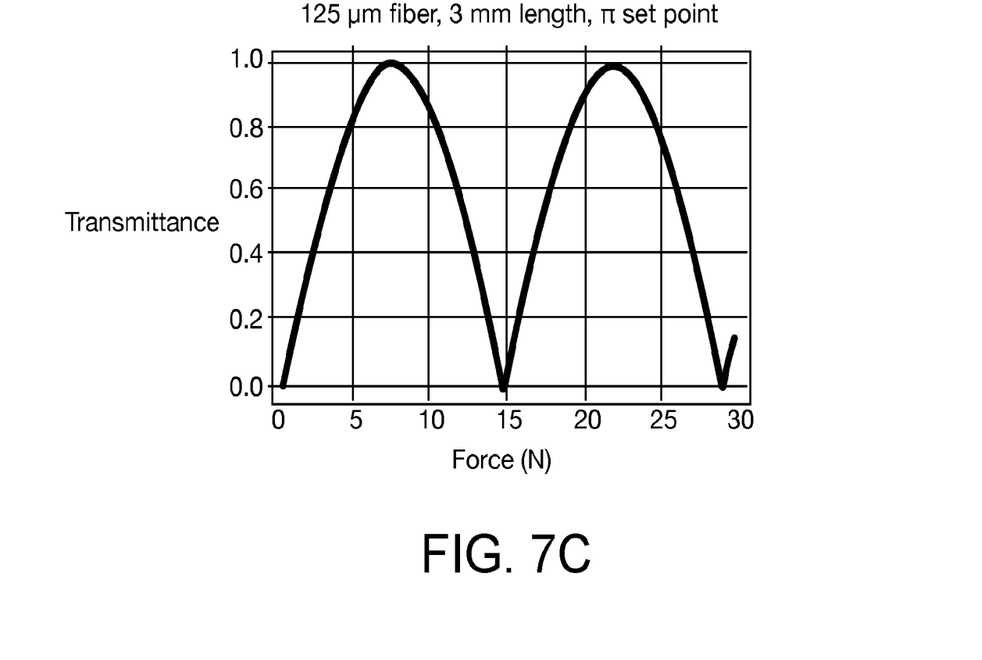
Figure 7D:
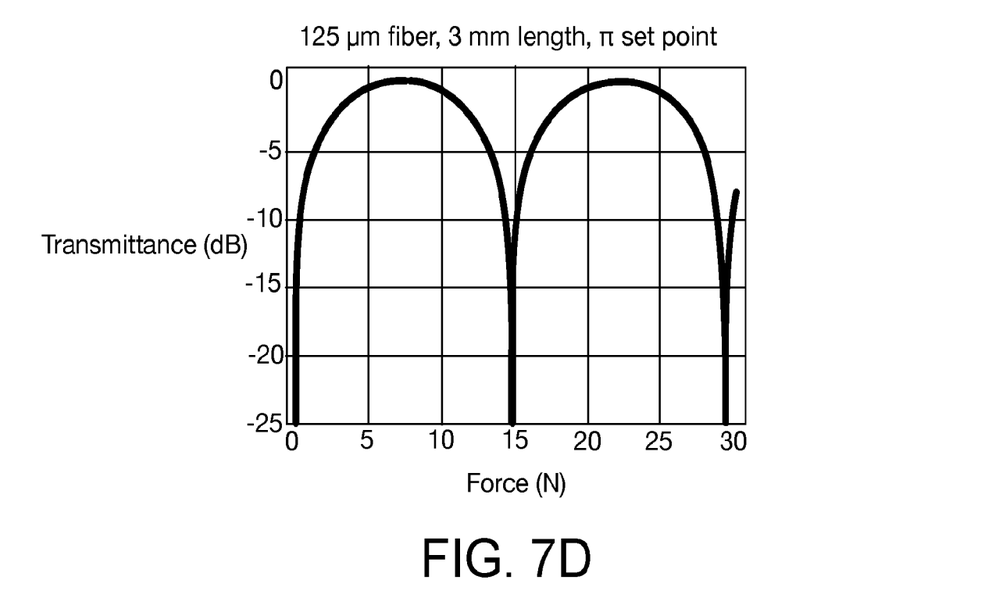

The phase of the curves (i.e., their offset along the horizontal axis in FIG. 7A, 7B can be changed by changing the length or birefringence of birefringence fiber 225. For example, FIGS. 7C and 7D show transmittance through the output polarizer as a function of force on the birefringent fiber for the case where the phase delay is $\pi$ and the length is 3 mm (i.e., the birefringence is reduced by a factor of 2). Hence, different lengths and birefringences of birefringent fiber 225 may be used to vary the transmittance vs. force curve, including changing the maximum and minimum transmittance values. Furthermore, the relative angles of the birefringence axes of the two polarizing fibers 315, 315 and birefringent fiber 225 can be varied to vary the transmittance vs. force curve.

Notably, the modulator examples described above are operable without free-space optics. The fibers enlisted may be single-mode or multi-mode. Also of note, the modulator examples described above may be implemented in any optical system where the fiber perturbation achieves a sufficient modulation frequency and amplitude. In some optical systems, one or more modulators in conformance with one or more of the embodiments described above are implemented within a laser. Optical losses within the laser may thereby be modulated to control operation of the laser in any manner known to be suitable in the art. In some other optical systems including a laser, one or more modulators in conformance with one or more of the embodiments described above are implemented outside of the laser, for example to condition and/or filter an output of the laser in any manner known to be suitable in the art.

Figure 8:
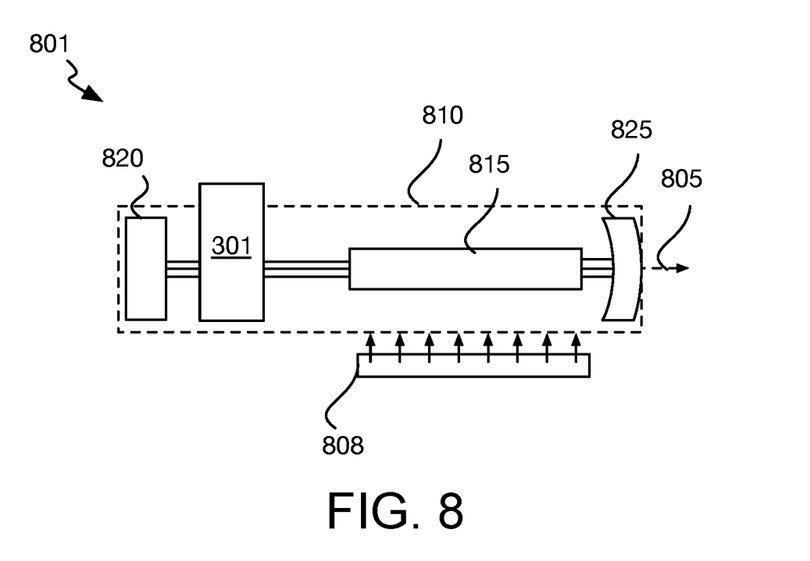
FIG. 8 is a schematic of a laser including a modulator in accordance with some embodiments.

FIG. 8 is a schematic of a laser 801 including a modulator in accordance with some embodiments. As shown, laser 801 is an assembly that comprises an optical cavity 810. Optical cavity 810 may have any architecture (e.g., Fabry-Perot, etc.) known to be suitable for supporting a standing wave for any desired resonance frequencies. For an example where laser 801 is a fiber laser, optical cavity 810 may, for example, comprise one or more lengths of optical fiber. In the illustrated schematic optical cavity 810 includes a high-reflectivity mirror 820 and a partially reflective mirror 825, which is further operable as an output coupler through which an output beam 805 is generated by laser 801. Mirrors 820 and 825 may have any architecture known to be suitable for maintaining a stable standing wave. For an example where laser 801 is a fiber laser, mirrors 820 and 825 may be fiber Bragg gratings (FBGs) with mirror 820 having a greater grating reflectivity than mirror 825. An optical gain medium 815 and optical modulator 301 is within optical cavity 810. Although only one optical gain medium 815 is illustrated, two or more optical gain medium 815 may be present. Optical gain medium 815 may be any medium that can absorb energy from an energizing means 808 and enter one or more excited states. At some threshold energy level, optical gain medium 815 is further to undergo stimulated emission. In some examples where laser 801 is a fiber laser, optical gain medium 815 comprises one or more lengths of fiber doped with one or more rare earth (RE) elements. The RE dopant may be any rare earth element known suitable for the purpose, such as, but not limited to Yb, Nd, Er, and Tm.

Laser 801 further comprises an energizing means 808 operable to energize optical gain medium 815 that may comprise any electromagnetic and/or optical pump source. Energizing means 808 may entail any device(s) known to be suitable for transferring energy into gain medium 815. In some examples where laser 801 is a fiber laser, energizing means 808 may be a pump laser comprising one or more laser diodes operable over a band suitable for gain medium 815. Laser 801 further comprises modulator 301, which may have any of the functions and/or attributes or properties described elsewhere herein. Within cavity 810, modulator 301 may be on either side of gain medium 815. The optical path of cavity 810 comprises a length of birefringent fiber between two lengths of polarizing fibers that are included within modulator 301. Even for examples where laser 801 is not a fiber laser (e.g., including one or more free-space optics), fiber lengths in modulator 301 are in the optical path within which the standing wave(s) reside. Modulator 301 is then to receive a control signal, for example substantially as described elsewhere herein, and in response to control signal, vary optical loss within cavity 810 through action upon the lengths of birefringent fiber in any of the manners described elsewhere herein. Modulation of transmittance through an output polarizing fiber coupled to the optical gain medium 815 may thereby be enlisted to modulate lasing characteristics within cavity 810 in any suitable manner.

Figure 9:
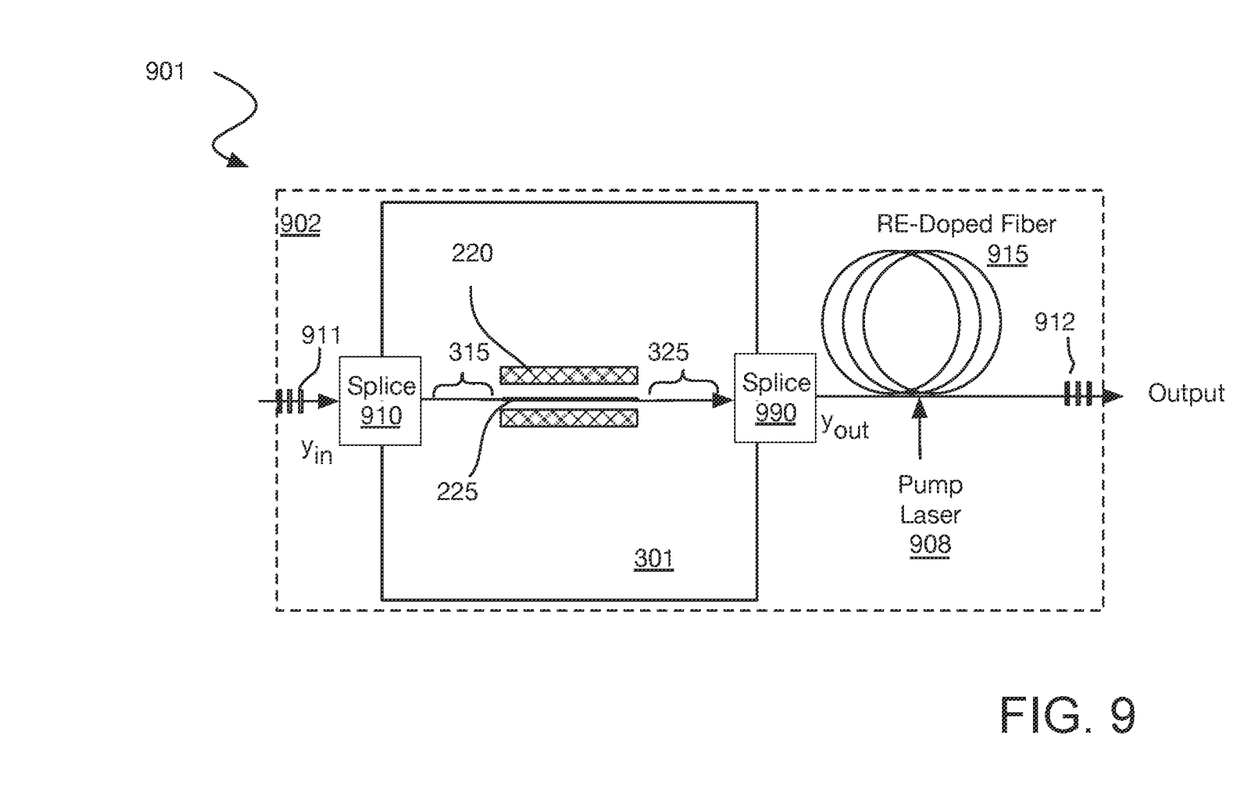
FIG. 9 is a schematic of an optical system including a modulator within a resonant cavity in accordance with some embodiments.

FIG. 9 is a schematic of an optical system 901 including modulator 301 within an optical cavity 902, in accordance with some fiber laser embodiments. As shown, a first port (e.g., input) of modulator 301 comprises a fiber splice 910. A first FBG 911 is coupled to fiber splice 910. A second port (e.g., output) of modulator 301 comprises another fiber splice 990. A RE-doped fiber 915 is coupled output polarizing fiber 325 at fiber splice 990. Pump laser 908 is coupled into RE-doped fiber 915, and RE-doped fiber 915 is further coupled to a second FBG 912. In some examples, pump laser 908 comprises one or more laser diodes. In the illustrated example, FBG 912 is operable as an output coupler from which an output beam may be launched into an external portion of optical system 901 that may further include any number of components and/or assemblies. Input polarizing fiber 315 has a first end at splice 910 and a second end joined (e.g., spliced, fused, etc.) to a first end of birefringent fiber 225.

Cavity 902 comprises only fiber (i.e., an all-fiber modulated laser cavity) and is devoid of any free-space (bulk) optical components. As described above, a perturbation device is to apply action upon birefringent fiber 225 to modulate its birefringence, for example in response to a modulation. At lower transmittance (higher attenuation) levels, optical loss is greater than at higher transmittance (lower attenuation) levels. In some examples, the variation in loss within optical cavity 902 induces pulsed laser operation. The pulse frequency may be varied as a function of the round-trip time associated with the optical path length of cavity 902 with the pulses resulting from amplitude modulation associated with the operation of modulator 301.

The Q-factor of cavity 902 may be varied by modulator 301 at repetition rates sufficient to generate Q-switch output pulses or to actively mode-lock the laser output. For mode-locked operation, optical loss through output polarizing fiber 325 may be modulated only slightly, for example ~10%, while for Q-switching, a larger modulation of transmittance (e.g., 3-40 db) is advantageous. Notably, passively Q-switched lasers (e.g., employing a saturable absorber) typically rely on one or more bulk, free-space optical components, and the repetition frequency cannot be modified independent of other operational parameters and is typically unstable (non-uniform temporal spacing of the output pulses). With modulator 301 inserted within the resonant optical cavity, Q-switching is active and fully tunable, for example between a few Hz up to MHz, as constrained only by the fiber perturbation rate, and the pulse timing is determined by the waveform driving the modulator (and can thus be stable and/or synchronized to an external trigger or clock signal). This approach thus enables a range of repetition frequencies, a stable repetition frequency, synchronization of the repetition frequency or individual pulses with an external event or clock, and even pulse-on-demand operation.

Figure 10:
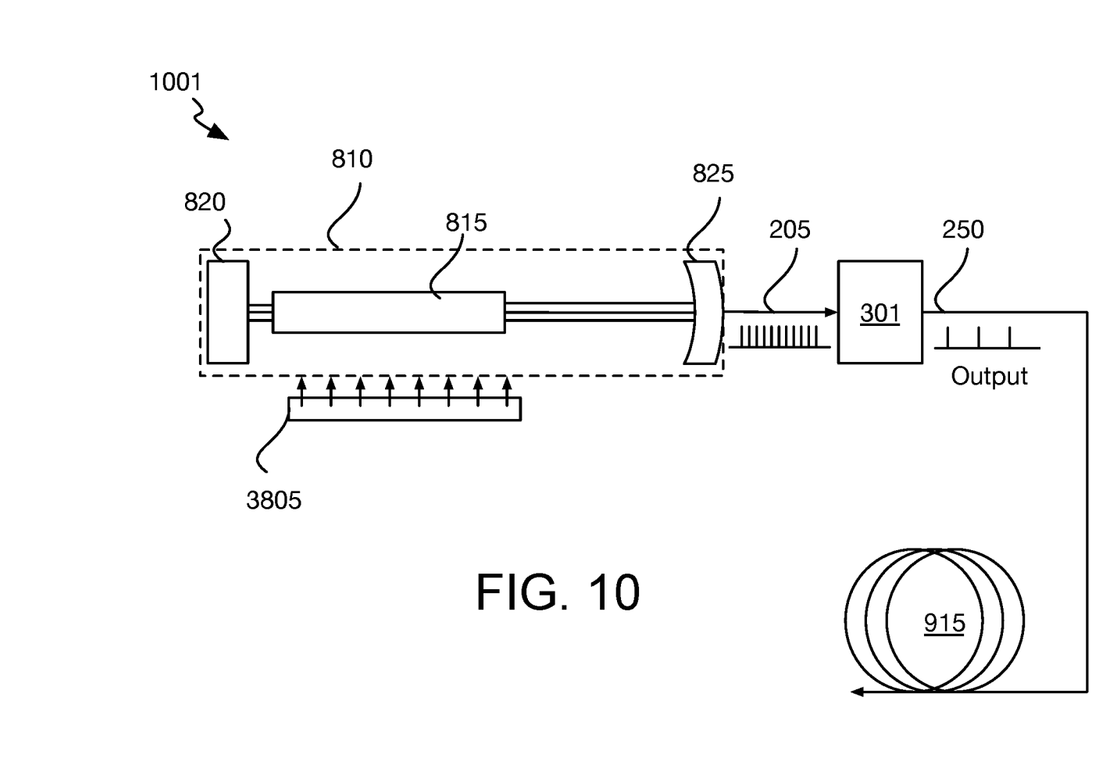
FIG. 10 is a schematic of an optical system including a modulator coupled to an output of a resonant cavity in accordance with some embodiments.

FIG. 10 is a schematic of an optical system 1001 including modulator 301 coupled to an output of optical cavity 810 in accordance with some embodiments. In optical system 1001, components having the same reference number introduced in the context of optical modulator 301 (FIG. 3) and optical cavity 810 (FIG. 8) have substantially the same function(s) and/or may have any of the features or attributes described above. In system 1001, cavity 810 is operable in a pulsed output mode. Any means may be employed within cavity 810 to achieve the pulsed output, for example through the use of any active or passive variable attenuator. In some examples, a transmittance modulator having one or more of the features described elsewhere herein is employed within cavity 810 to generate a pulsed (e.g., mode-locked or Q-switched) output beam. In other examples, cavity 810 may include a saturable absorber or any electro-optic modulator known to be a suitable variable attenuator.

Pulsed laser output having given pulse train characteristics (e.g., particular frequency and power) are input to modulator 301. Modulator 301 includes one or more perturbation devices, for example substantially as described elsewhere herein, that acts upon a length of birefringent fiber to modulate transmission of the input pulse train. The pulse train modulation may be either in the form of temporal pulse carving or shaping, or if the transmission modulation is timed appropriately with respect to the pulse train, the pulse train modulation may be sufficient to pass or "pick" only a subset of pulses (including potentially a single pulse) to modulator output 250. The carved and/or picked pulses may then be launched into other components of optical system 1001. For example, picked pulses exiting modulator output 250 may be amplified in gain medium 915.

Embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to have been physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure. It will be recognized that the invention is not limited to the embodiments so described, but can be practiced with modification and alteration without departing from the scope of the appended claims. The above embodiments may include the undertaking of only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

Having described and illustrated both general and specific principles of examples of the presently disclosed technology, it should be apparent that the examples may be modified in arrangement and detail without departing from such principles.

What is claimed is:

1. An optical modulator, comprising:
   an optical input to receive a beam of light having a first polarization state and an optical power;
   an optical output having a predetermined polarization orientation relative to the first polarization state;
   a length of birefringent fiber between the optical input and the optical output, wherein the length of birefringent fiber is oriented to couple some of the optical power into both fast and slow birefringence axes;
   a perturbation device to modulate, through action upon at least a portion of the length of birefringent fiber, a polarization state of the beam that enters the optical output; and
   a controller input coupled to the perturbation device, wherein the perturbation device is to act upon the length of birefringent fiber in response to a control signal received through the controller input to vary a transmittance of the beam through the optical modulator from a first transmittance level at a first time instance to a second transmittance level at a second time instance,
wherein the action comprises application of a compressive stress along at least one of the fast and slow birefringence axes, wherein the perturbation device is to modulate a magnitude of the compressive stress, and wherein the application of the compressive stress alters a phase delay between the fast and the slow birefringence axes,
wherein the first transmittance level is associated with a first phase delay between the fast and the slow birefringence axes, and the second level of transmittance is associated with a second phase delay between the fast and slow birefringence axes, and
wherein at the optical input the beam of light has a same optical power at the first and second time instances, and wherein an optical power transmitted from the optical output at the first time instance is to be at least 10% greater than an optical power transmitted through the optical output at the second time instance.

2. The optical modulator of claim 1, wherein:
the first polarization state is a first linear polarization state; and
the fast and slow birefringence axes are oriented to between 0° and 90° of the first linear polarization state.

3. The optical modulator of claim 2, wherein:
the fast and slow birefringence axes are oriented at approximately 45° of the first linear polarization state; and
the optical output has a polarization orientation substantially aligned with the first linear polarization state.

4. The optical modulator of claim 1, wherein the perturbation device comprises at least one of a mechanical clamp or a piezoelectric material.

5. The optical modulator of claim 1, wherein the compressive stress is to be applied substantially parallel to one of the fast or slow birefringence axes.

6. The optical modulator of claim 1, wherein:
the optical input comprises a first polarizing fiber having a higher polarization extinction ratio (PER) than the length of birefringent fiber, and wherein the first polarization fiber is oriented to propagate the optical beam with the first polarization state into the length of birefringent fiber; and
the optical output comprises a second polarizing fiber having a higher PER than the length of birefringent fiber, wherein the second polarization fiber is oriented relative to the first polarizing fiber to propagate the optical beam with the first polarization state.

7. The optical modulator of claim 1, wherein the length of birefringent fiber comprises a cladding surrounding a core, wherein the core has an elliptical cross-section or the cladding comprises a stress rod.

8. The optical modulator of claim 1, wherein the perturbation device is to transition between first and second states according to an analog waveform with the transmittance to vary according to a continuous function that includes the first and second levels of transmittance.

9. An optical system, comprising:
a laser; and
the optical modulator of claim 1, wherein the optical input is coupled to an output coupler of the laser and wherein the optical input comprises a polarizing fiber to define the first polarization state.

10. The system of claim 9, further comprising a fiber amplifier coupled to an output of the optical modulator.

11. A laser, comprising:
a resonant optical cavity comprising an optical gain medium, and an optical modulator;
a means to energize the optical gain medium; and
an output coupler to couple at least a portion of an optical beam out of the cavity, wherein the optical modulator further comprises:
a first length of polarizing fiber, a second length of polarizing fiber, and a length of birefringent fiber therebetween, wherein the first and second lengths of polarizing fiber have higher polarization extinction ratios than the length of birefringent fiber, and wherein the first and second lengths of polarizing fiber are oriented to pass a beam of light having a first polarization state; and
a perturbation device to temporally vary optical loss, in response to a control signal, within the cavity through action upon the length of birefringent fiber that modulates a phase delay between fast and slow birefringence axes in the length of birefringent fiber,
wherein a first level of optical loss is associated with a first phase delay between the fast and slow birefringence axes and a second level of optical loss is associated with a second phase delay between the fast and slow birefringence axes, and
wherein a power of the optical beam coupled out of the cavity at a first time corresponding the first phase delay is to be at least 10% greater than a power of the optical beam coupled out of the cavity at a second time corresponding to the second phase delay.

12. The laser of claim 11, wherein:
the gain medium comprises optical fiber; and
the means to energize comprises a pump laser.

13. The laser of claim 11, wherein the perturbation device is to modulate transmittance of the optical beam between a first transmittance level and a second transmittance level to induce pulsed operation of the laser.

14. The laser of claim 13, wherein the perturbation device is to temporally modulate the transmittance of the optical beam between the first and second transmittance levels at a repetition rate to actively mode-lock the laser.

15. The laser of claim 13, wherein a difference between the first and second transmittance levels is of a sufficient magnitude to Q-switch the laser.

16. An optical system, comprising:
a resonant optical cavity comprising an optical gain medium;
a means to energize the optical gain medium;
an output coupler to couple at least a portion of an optical beam out of the cavity; and
a fiber optical modulator with an input coupled to the output coupler, wherein the fiber optical modulator further comprises:
a first length of polarizing fiber, a second length of polarizing fiber, and a length of birefringent fiber therebetween, wherein the first and second lengths of polarizing fiber have higher polarization extinction ratios than the length of birefringent fiber, and wherein the first and second lengths of polarizing fiber are oriented to pass the optical beam in a first polarization state; and
a perturbation device to modulate, through action upon the length of birefringent fiber, a transmittance of the beam through the optical modulator from a first transmittance level at a first time instance corresponding to a first phase delay between the fast and slow birefringence axes of the birefringent fiber to a second transmittance level at a second time instance corresponding to a second phase delay between the fast and slow birefringence axes of the birefringent fiber, wherein the first transmittance level is to be at least 10% greater than the second transmittance level.

17. The optical system of claim 16, wherein the perturbation device is to vary an optical loss between the lengths of fiber to pick optical beam pulses that exit the output coupler.

18. The optical system of claim 17, further comprising a function generator coupled to the optical modulator, wherein the perturbation device is to modulate transmittance of the optical beam between the first and second levels in response to one or more signals received from the function generator.

* * * * *